(12) United States Patent
Kim et al.

(10) Patent No.: US 11,087,056 B2
(45) Date of Patent: Aug. 10, 2021

(54) LEAKAGE DISTRIBUTION ESTIMATION SYSTEM AND METHOD OF SEMICONDUCTOR DEVICE

(71) Applicants: SK hynix Inc., Icheon (KR); POSTECH ACADEMY-INDUSTRY FOUNDATION, Pohang (KR)

(72) Inventors: Young Hwan Kim, Pohang (KR); Hyun Jeong Kwon, Pohang (KR); Byeong Jun Bang, Ansan (KR)

(73) Assignees: SK hynix Inc., Icheon (KR); POSTECH ACADEMY-INDUSTRY FOUNDATION, Pohang (KR)

( * ) Notice: Subject to any disclaimer, the term of this patent is extended or adjusted under 35 U.S.C. 154(b) by 291 days.

(21) Appl. No.: 16/232,713

(22) Filed: Dec. 26, 2018

(65) Prior Publication Data

US 2019/0331723 A1    Oct. 31, 2019

(30) Foreign Application Priority Data

Apr. 30, 2018 (KR) .................... 10-2018-0049540

(51) Int. Cl.
*G06F 30/30* (2020.01)
*G01R 31/28* (2006.01)
*G06F 30/367* (2020.01)

(52) U.S. Cl.
CPC ......... *G06F 30/30* (2020.01); *G01R 31/2851* (2013.01); *G06F 30/367* (2020.01)

(58) Field of Classification Search
CPC .................................................... G01R 31/50
See application file for complete search history.

(56) References Cited

U.S. PATENT DOCUMENTS

| | | | |
|---|---|---|---|
| 6,239,607 B1 | 5/2001 | Maxwell et al. | |
| 7,603,638 B2 | 10/2009 | Haeussler et al. | |
| 2008/0103708 A1 | 5/2008 | Inoue et al. | |
| 2015/0025857 A1* | 1/2015 | Arsovski | G06F 30/33 703/2 |

* cited by examiner

*Primary Examiner* — Manuel A Rivera Vargas

(57) ABSTRACT

A semiconductor device includes a leakage distribution estimation system. The system includes: a parameter sampling unit suitable for selecting sample values for parameters, which are changed according to a process variation of the semiconductor device; a data transformation unit suitable for transforming the sample values selected by the parameter sampling unit into Gaussian sample values; a leakage data generation unit suitable for generating leakage data of the semiconductor device by performing a leakage simulation using node bias information on switching elements included in the semiconductor device, information extracted for leakage components of the switching elements, and the Gaussian sample values; and a Gaussian mixed model (GMM) modeling unit suitable for clustering the leakage data into a plurality of clusters, generating Gaussian components corresponding to the respective clusters using the leakage data of the clusters and mixing the Gaussian components thereby to determine a leakage distribution of the semiconductor device.

13 Claims, 8 Drawing Sheets

FIG. 2

| | PMOS_Iab.Iut | | | | |
| PMOS_Ibs.Iut | | | | | |
| NMOS_Isub.Iut | | | | | |
| L | W | Vd | Vs | Vg | Leak |
| 1.5900e-08 | 3.0900e-08 | 0.000 | 0.063 | 0.679 | -6.703378e-06 |
| 1.5900e-08 | 3.0900e-08 | 0.000 | 0.063 | 0.686 | -6.703378e-06 |
| 1.5900e-08 | 3.0900e-08 | 0.000 | 0.063 | 0.693 | -6.886919e-06 |
| 1.5900e-08 | 3.0900e-08 | 0.000 | 0.063 | 0.700 | -6.974000e-06 |
| 1.5900e-08 | 3.0900e-08 | 0.000 | 0.070 | 0.000 | -7.441628e-11 |
| 1.5900e-08 | 3.0900e-08 | 0.000 | 0.070 | 0.007 | -8.910593e-11 |

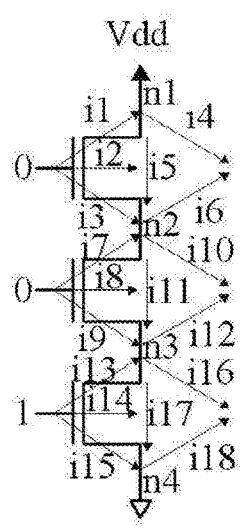
FIG. 6A
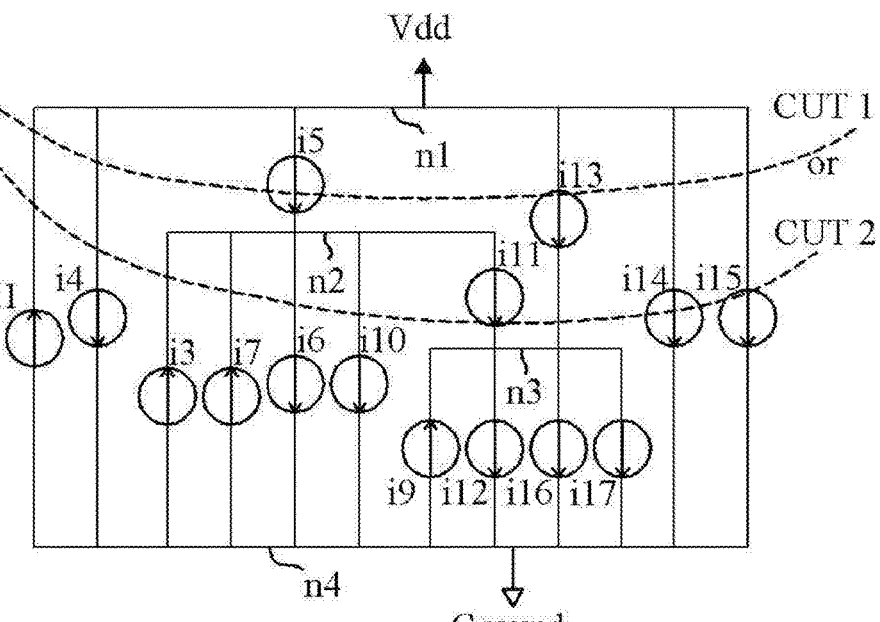
FIG. 6B
FIG. 7
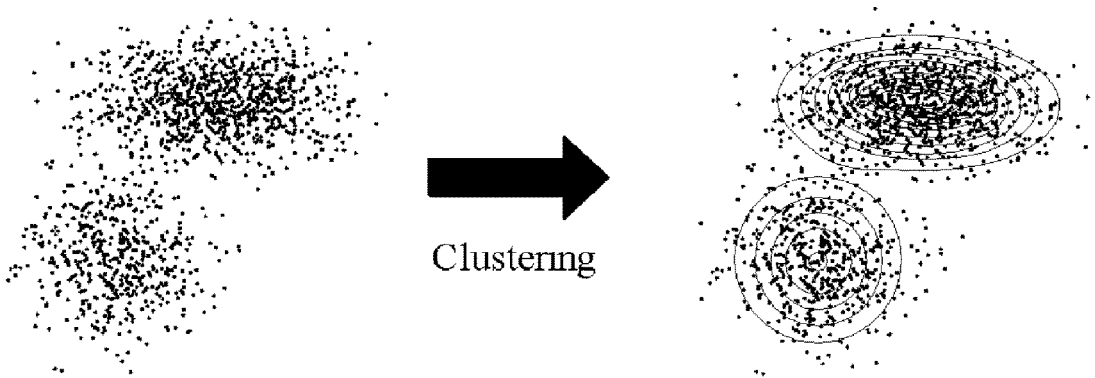
Clustering

LEAKAGE DISTRIBUTION ESTIMATION SYSTEM AND METHOD OF SEMICONDUCTOR DEVICE

CROSS-REFERENCE TO RELATED APPLICATION

This application claims priority under 35 U.S.C. § 119 to Korean Patent Application No. 10-2018-0049540 filed on Apr. 30, 2018, which is incorporated by reference herein in its entirety.

BACKGROUND

1. Field

Exemplary embodiments relate to a leakage distribution estimation system and method of a semiconductor device, which can correctly estimate a leakage distribution using a smaller number of leakage data.

2. Discussion of the Related Art

Recently, the rapid growth of the mobile electronic device market has increased the demand for a device capable of reducing power consumption, in order to improve the lifetime of a battery of the device. Furthermore, as the scale of transistors in a semiconductor device is reduced, leakage power may occupy a large proportion of the power consumption of the semiconductor device.

Therefore, it is very important to accurately estimate leakage power occurring in a semiconductor device during a circuit design process for the semiconductor device.

Furthermore, leakage estimation of a system-on-chip (SoC) circuit is mainly performed at a gate level or higher level. However, since a dynamic random access memory (DRAM) has a cell structure including a single transistor and operates in an analog operating range, it is proper to perform leakage estimation of the DRAM at a transistor level. Therefore, further research needs to be conducted on the leakage analysis at the transistor level for the DRAM.

SUMMARY

Various embodiments are directed to a statistical leakage analysis method capable of efficiently estimating a distribution of circuit leakage currents at a transistor level, the circuit leakage currents being caused by a process variation of a semiconductor device.

In an embodiment, a leakage distribution estimation system of a semiconductor device, the system comprising: a parameter sampling unit suitable for selecting sample values for parameters, which are changed according to a process variation of the semiconductor device; a data transformation unit suitable for transforming the sample values selected by the parameter sampling unit into Gaussian sample values; a leakage data generation unit suitable for generating leakage data of the semiconductor device by performing a leakage simulation using node bias information on switching elements included in the semiconductor device, information extracted for leakage components of the switching elements, and the Gaussian sample values; and a Gaussian mixed model (GMM) modeling unit suitable for clustering the leakage data into a plurality of clusters, generating Gaussian components corresponding to the respective clusters using the leakage data of the clusters and mixing the Gaussian components thereby to determine a leakage distribution of the semiconductor device.

In an embodiment, a leakage distribution estimation system of a semiconductor system, the leakage distribution estimation system comprising: a plurality of sub estimation systems being a one-to-one correspondence with a plurality of sub systems, and suitable for generating leakage distributions of the sub systems, the semiconductor system including the plurality of sub systems; and a sequential addition unit suitable for deciding a leakage distribution of the semiconductor system by sequentially adding the leakage distributions of the plurality of sub systems, wherein each of the sub estimation systems comprises: a parameter sampling unit suitable for selecting sample values for parameters, which are changed according to a process variation of the sub system; a data transformation unit suitable for transforming the sample values selected by the parameter sampling unit into Gaussian sample values; a leakage data generation unit suitable for generating leakage data of the sub system by performing a leakage simulation using node bias information on switching elements included in the sub system, information extracted for leakage components of the switching elements, and the Gaussian sample values; and a GMM modeling unit suitable for clustering the leakage data into a plurality of clusters, generating Gaussian components corresponding to the respective clusters using the leakage data of the clusters, and mixing the Gaussian components thereby to determine a leakage distribution of the sub system.

In an embodiment, a leakage distribution estimation method of a semiconductor device, the method comprising: selecting sample values for parameters which are changed according to a process variation of the semiconductor device; transforming the selected sample values into Gaussian sample values; generating leakage data of the semiconductor device by performing a leakage simulation using node bias information on switching elements included in the semiconductor device, information extracted for leakage components of the switching elements, and the Gaussian sample values; and clustering the leakage data into a plurality of clusters; generating Gaussian components corresponding to the respective clusters using the leakage data of the clusters; and determining a leakage distribution of the semiconductor device by mixing the Gaussian components.

BRIEF DESCRIPTION OF THE DRAWINGS

FIG. 2 illustrates files in a lookup table in accordance with an embodiment.

FIGS. 6A and 6B illustrate a method for calculating a leakage value at a system level, using values of leakage components at a transistor level.

FIG. 7 illustrates a process of clustering leakage data.

DETAILED DESCRIPTION

Figure 1:
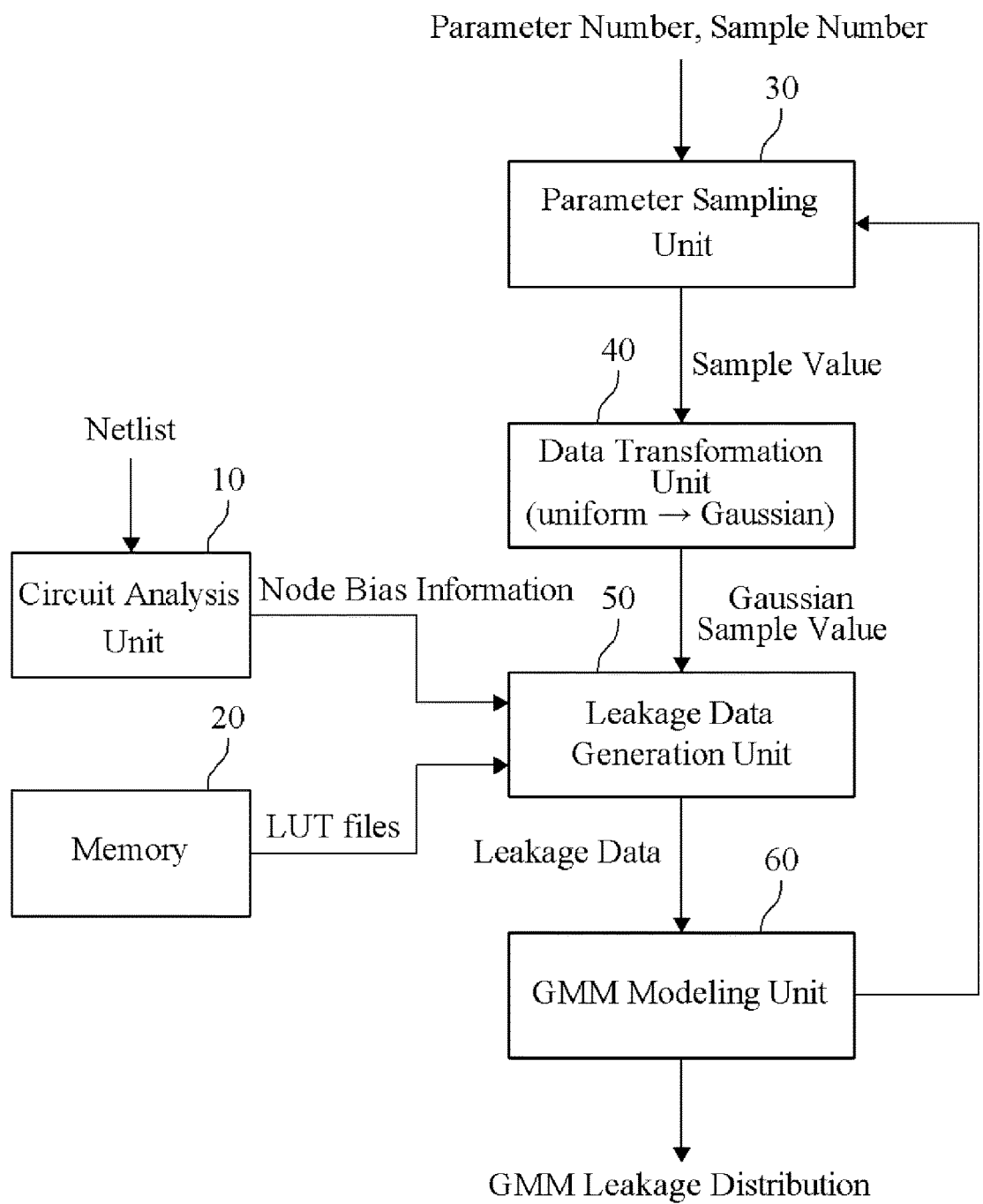
FIG. 1 illustrates a leakage distribution estimation system in accordance with an embodiment.

Various embodiments will be described below in more detail with reference to the accompanying drawings. The present invention may, however, be embodied in different forms and should not be construed as limited to the embodiments set forth herein. Rather, these embodiments are provided so that this disclosure will be thorough and complete, and will fully convey the scope of the embodiments to those skilled in the art. Throughout the disclosure, like reference numerals refer to like parts throughout the various figures and embodiments of the present disclosure.

Moreover, detailed descriptions related to publicly known functions or configurations will be ruled out in order not to obscure unnecessarily subject matters of the present invention.

The terms such as 'first' and 'second' may be used to describe various components, but the components are not limited by the terms, and the terms are used only to distinguish one component from another component.

FIG. 1 illustrates a leakage distribution estimation system in accordance with an embodiment.

The leakage distribution estimation system of FIG. 1 may include a circuit analysis unit 10, a memory 20, a parameter sampling unit 30, a data transformation unit 40, a leakage data generation unit 50, and a Gaussian mixed model (GMM) modeling unit 60.

The circuit analysis unit 10 receives circuit design data of a semiconductor device, performs a circuit simulation on the semiconductor device using the circuit design data, and extracts node bias information on components, such as transistors acting as switching elements that are included in the semiconductor device based on results of the circuit simulation. For example, the circuit analysis unit 10 performs the circuit simulation on connection information (netlist) of the transistors of the semiconductor device and extracts the node bias information, e.g., information on a channel length L, a channel width W, a gate voltage Vg, a source voltage Vs, and a drain voltage Vd, for each of the transistors. The transistors may constitute a corresponding circuit. In the present embodiment, the circuit analysis unit 10 is included in the leakage distribution estimation system, and thus the leakage distribution estimation system extracts the node bias information by itself. However, in another embodiment, the leakage distribution estimation system may receive the node bias information from outside in advance, and store the received node bias information in the memory 20 included in the leakage distribution estimation system.

The memory 20 also stores leakage values, e.g., leakage current values, which are obtained at a transistor level, to correspond to leakage components of a lookup table (LUT). As shown in Table 1, the LUT may include, as LUT information, LUT files containing leakage values, e.g., leakage current values that have been extracted in advance according to a process variation, the leakage current values being generated according to each type of transistor, e.g., an NMOS transistor or a PMOS transistor.

TABLE 1

| Type | Leakage component | LUT file name |
|------|-------------------|---------------|
| NMOS | Subthreshold leakage | nmos_Isub.lut |
|      | Body-to-drain leakage | nmos_Ibd.lut |
|      | Body-to-source leakage | nmos_Ibs.lut |
|      | Gate-to-body leakage | nmos_Igb.lut |
| PMOS | Subthreshold leakage | pmos_Isub.lut |
|      | Body-to-drain leakage | pmos_Ibd.lut |
|      | Body-to-source leakage | pmos_Ibs.lut |
|      | Gate-to-body leakage | pmos_Igb.lut |

As shown in FIG. 2, each of the LUT files may store leakage current values matched with values of parameters (or parameter values), the leakage current values being previously extracted for the respective leakage components according to a transistor type when each of the parameter values is being changed within a predetermined range. For example, the LUT files may store leakage current values matched with parameter values, the leakage current values being previously extracted for the respective leakage components according to each of an NMOS transistor and a PMOS transistor when values of the parameters, such as a channel length L, a channel width W, a gate voltage Vg, a source voltage Vs, and a drain voltage Vd, of the NMOS transistor or the PMOS transistor are being changed in their predetermined ranges.

For example, in FIG. 2, the LUT file NMOS_Isub.lut contains subthreshold leakage current values obtained by changing values of the parameters L, W, Vd, Vs, and Vg of the NMOS transistor. FIG. 2 shows the subthreshold leakage current value that varies as values of the parameters Vs and Vg are being changed.

The memory 20 may include one or more nonvolatile memories such as a flash memory, a resistive RAM (RRAM), a phase change RAM (PRAM), a magnetic RAM (MRAM), and a ferroelectric RAM (FeRAM). In the present embodiment, it is exemplified that the LUT is stored in the memory 20 included in the leakage distribution estimation system. However, in another embodiment, the LUT may be stored in an external storage medium, and the leakage distribution estimation system may read LUT files from the external storage medium in case of necessity.

The parameter sampling unit 30 may perform a sampling process on the semiconductor device, e.g., randomly select sample values, within a preset range, for parameters that need to consider a process variation which may occur during a fabrication process of the semiconductor device. In an embodiment, the preset range may be set by a system operator.

For example, when the number of parameters (referred to as 'parameter number'), which need to consider a process variation, and the number of sampling (referred to as 'sample number') are decided, the parameter sampling unit 30 randomly selects sample values corresponding to the parameter number and the sample number. Values of the parameters of a transistor, such as a length L and a width W, are designated in advance. However, actual values of the parameters of the transistor after the fabrication may be different from the designated values because of a process variation which occurs during a fabrication process. Therefore, the parameter sampling unit 30 may select various sample values for the parameters within an expected range, the sample values being changed depending on a process variation, and perform a simulation using the selected sample values to consider the process variation. More specifically, the samples are extracted from the parameter. The parameter samples are used for a Monte-Carlo (MC) simulation. The proposed method aims to reduce the number of MC runs. Therefore, the parameter samples should be extracted so that the convergence is achieved using small number of samples. Therefore, the proposed method uses the quasi random sequence, rather than pseudo random numbers, as the parameter samples. Among various quasi random sequences, the proposed method uses the sobol sequence. Sobol sequence converges faster than the pseudo random numbers because the sobol sequence is determined considering the discrepancy. Discrepancy is the mathematical quantity which reflects the non-uniformity of points in a set. The number of parameters is the dimension of the sobol sequence. In addition, the number of samples is the length of the sobol sequence.

The parameter sampling unit 30 in accordance with the present embodiment may use a Sobol sequence as a method for selecting more uniformly distributed values as random variables (i.e., sample values). That is, the parameter sampling unit 30 may generate a Sobol sequence in which the number of parameters is set to a dimension and the number of samples is set to a length, in order to select the sample values. Furthermore, when the GMM modeling unit 60 requests additional sampling, the parameter sampling unit 30 may additionally select sample values by consecutively adding a new Sobol sequence to the previously generated Sobol sequence.

The data transformation unit 40 transforms the sample values selected by the parameter sampling unit 30 into Gaussian sample values. The transistor fabrication process is based on the supposition that the changes of parameter values according to a process variation follow the Gaussian distribution. However, since the Sobol sequence used in the parameter sampling unit 30 includes sample values selected from a uniform distribution, the sample values selected by the parameter sampling unit 30, i.e., the uniformly distributed Sobol sequence, need to be transformed into Gaussian sample values having the Gaussian distribution.

Figure 3A:
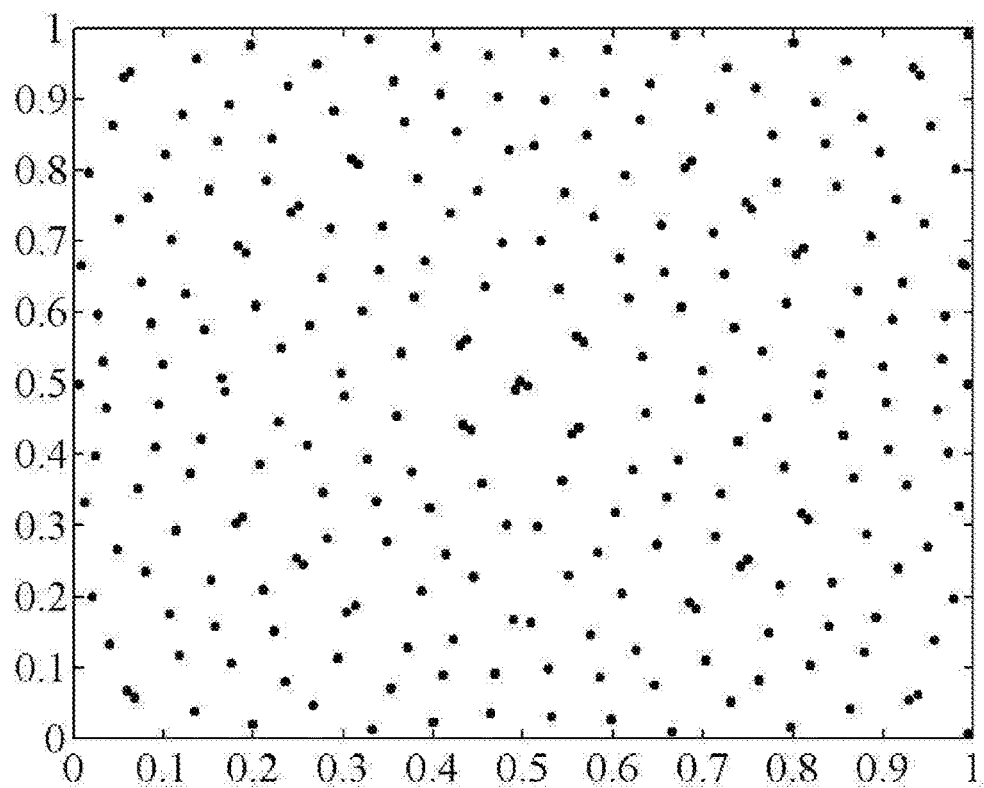
FIGS. 3A and 3B illustrate a Sobol sequence and Gaussian sample values obtained by transforming the Sobol sequence.
Figure 3B:
Figure 3B:
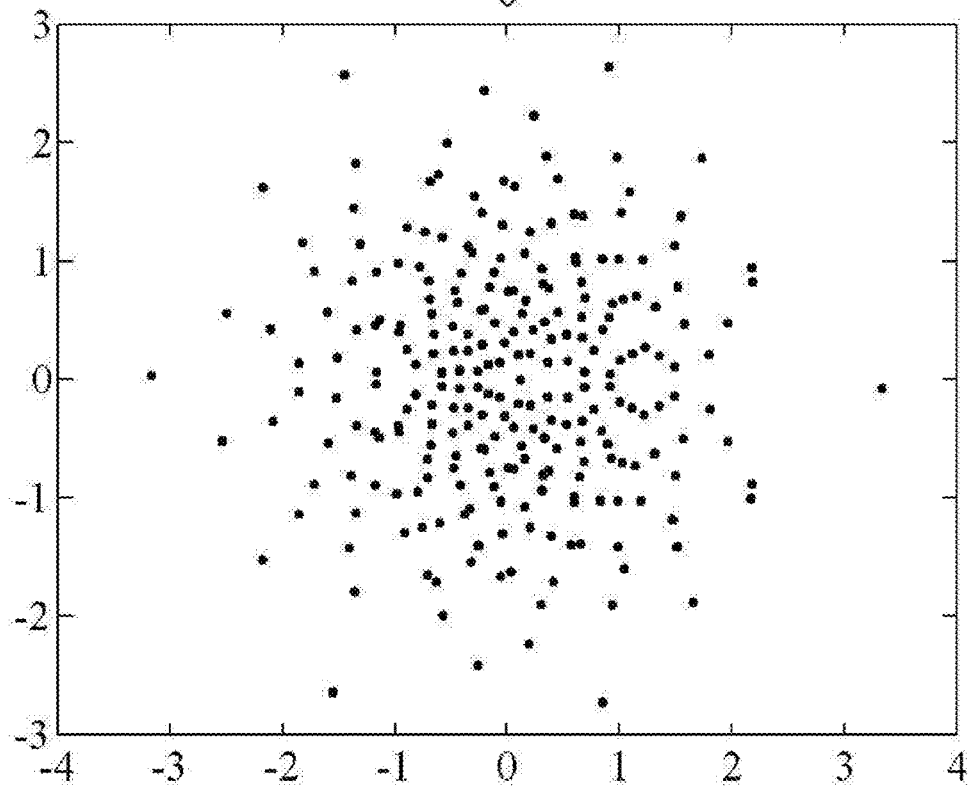

Therefore, the data transformation unit 40 transforms sample values selected to follow a uniform distribution shown in FIG. 3A into Gaussian sample values following the Gaussian distribution, which has a desired mean and a desired standard deviation, as illustrated in FIG. 3B. In order to transform uniformly distributed random variables into Gaussian random variables, the data transformation unit 40 may use the Box-Muller transformation. FIGS. 3A and 3B illustrate sample values extracted for two parameters, and the horizontal and vertical axes respectively correspond to variable values of the two parameters.

The leakage data generation unit 50 generates leakage data at a system level such as a semiconductor device level by performing a leakage simulation using the node bias information from the circuit analysis unit 10, the LUT information stored in the memory 20, and the Gaussian sample values generated by the data transformation unit 40.

For example, the leakage data generation unit 50 obtains first leakage values of leakage components, such as a sub-threshold leakage, a body-to-drain leakage, a body-to-source leakage, and a gate-to-body leakage, for each of the transistors used for the sampling by comparing the node bias information, e.g., L, W, Vg, Vs, and Vd, with the LUT information, and obtains leakage data at the system level using the first leakage values of the leakage components for the transistors that have been obtained at the transistor level.

The leakage data generation unit 50 also obtains second leakage values of the leakage components for each of the transistors based on the Gaussian sample values from the data transformation unit 40, and then obtains the leakage data at the system level corresponding to the Gaussian sample values, using the second leakage values of the leakage components for the transistors. At this time, when the node bias information or the Gaussian sample values are not present in the LUT, the leakage data generation unit 50 may estimate the first or second leakage values respectively corresponding to the node bias information or the Gaussian sample values through interpolation using values present in the LUT.

Figure 4:
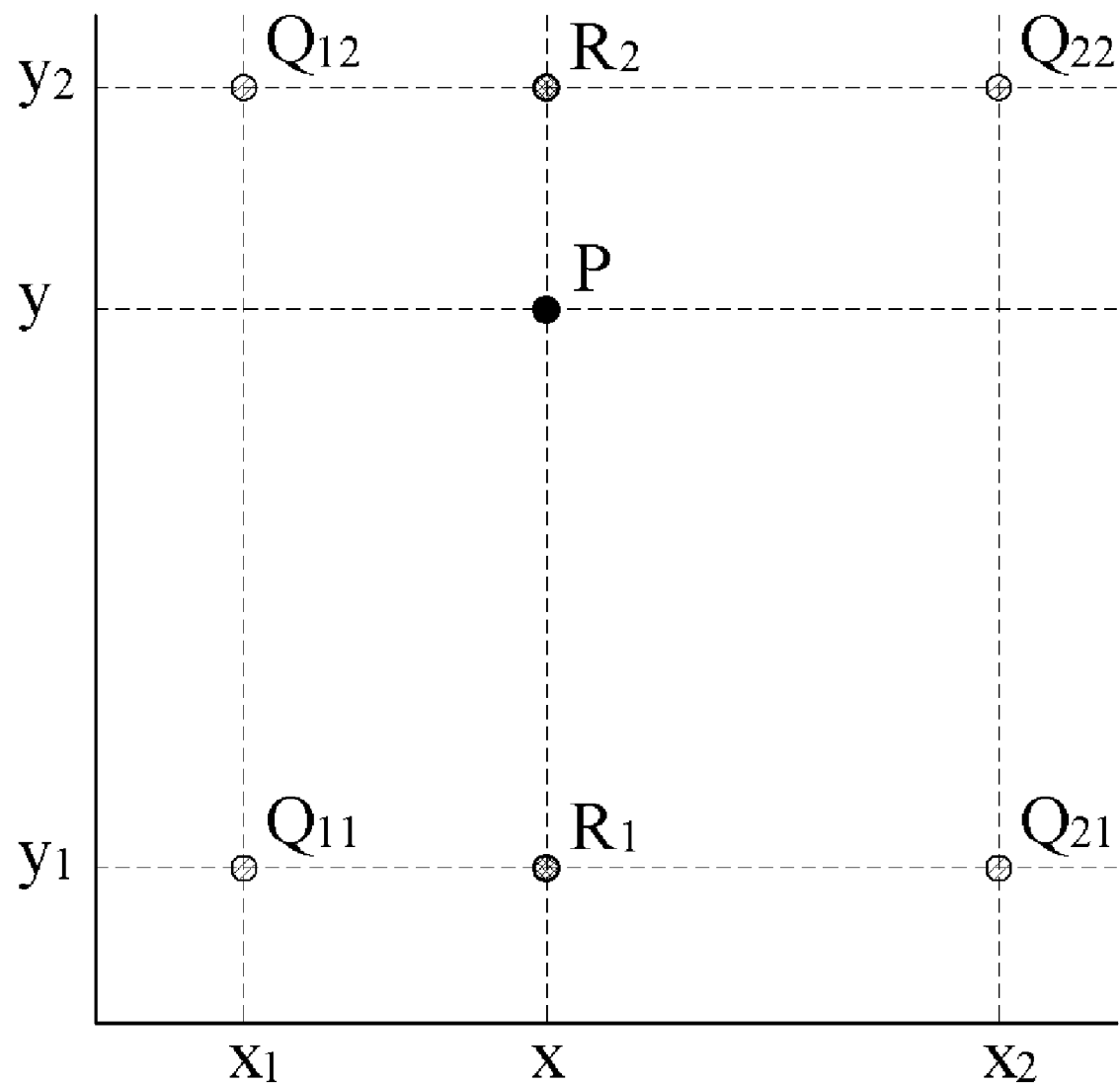
FIG. 4 illustrates a 2D interpolation method.

For example, when the parameter number is 2, the leakage data generation unit 50 may estimate the first or second leakage values using a 2D linear interpolation method in which a data value for a point P is extracted using values in the LUT as data values for grid points Q11, Q12, Q21, and Q22, as illustrated in FIG. 4. The method for obtaining the leakage data at the system level using the leakage values at the transistor level, i.e., using the leakage values of the leakage components, will be described later. In FIG. 4, the vertical and horizontal axes indicate parameter values of two parameters x and y, and each of R1 and R2 represents a result value of a 1D linear interpolation method for the x axis, the 1D linear interpolation method being an intermediate process of the 2D linear interpolation method. A 1D linear interpolation method for the y axis may be substantially the same as the 1D linear interpolation method for the x axis.

The GMM modeling unit 60 groups the leakage values at the system level (or leakage data) generated by the leakage data generation unit 50 into a plurality of clusters, and obtains a Gaussian function for each of the clusters using leakage data contained in each of the clusters in order to generate Gaussian components. The Gaussian function may indicate a probability density function (PDF) for leakage. Then, the GMM modeling unit 60 generates a GMM leakage distribution by mixing the generated Gaussian components.

At this time, the GMM modeling unit 60 may cluster the leakage data using an expectation-maximization (EM) algorithm.

The GMM modeling unit 60 may perform an operation of validating the clusters for the leakage data before generating the Gaussian components. For example, GMM can be used to estimate density function of the leakage data. For estimating the density function where the leakage data come from, the leakage data should be clustered into multiple Gaussian components. Clustering means that the parameters of GMM such as N, $\mu_i$, $\sigma_i^2$, and $\omega_i$ are determined.

A leakage distribution estimation system in accordance with an embodiment of the present disclosure is supposed to acquire a leakage distribution, which is similar to a leakage distribution acquired through the Monte-Carlo (MC) simulation, using a much smaller number of leakage data than the MC simulation. However, when the number of leakage data is not sufficient, the clustering can be failed into local minima. Thus, a sufficient number of leakage data are required to avoid the clustering failure. Therefore, the GMM modeling unit 60 may validate the clustering result. When the clustering result is not satisfactory, e.g., the number of leakage data is not enough for obtaining a desired number of clusters, the GMM modeling unit 60 may request additional sample values from the parameter sampling unit 30 thereby to collect additional leakage data. The GMM modeling unit 60 may calculate a weighted sum of the Gaussian components, thereby deciding a final GMM leakage distribution of a corresponding system, e.g., a semiconductor device. For example, the GMM modeling unit 60 can add the leakage data when the clustering result is not satisfactory, the accuracy of the Sobol sequence is continuously improved when more leakage data is added.

Figure 5:
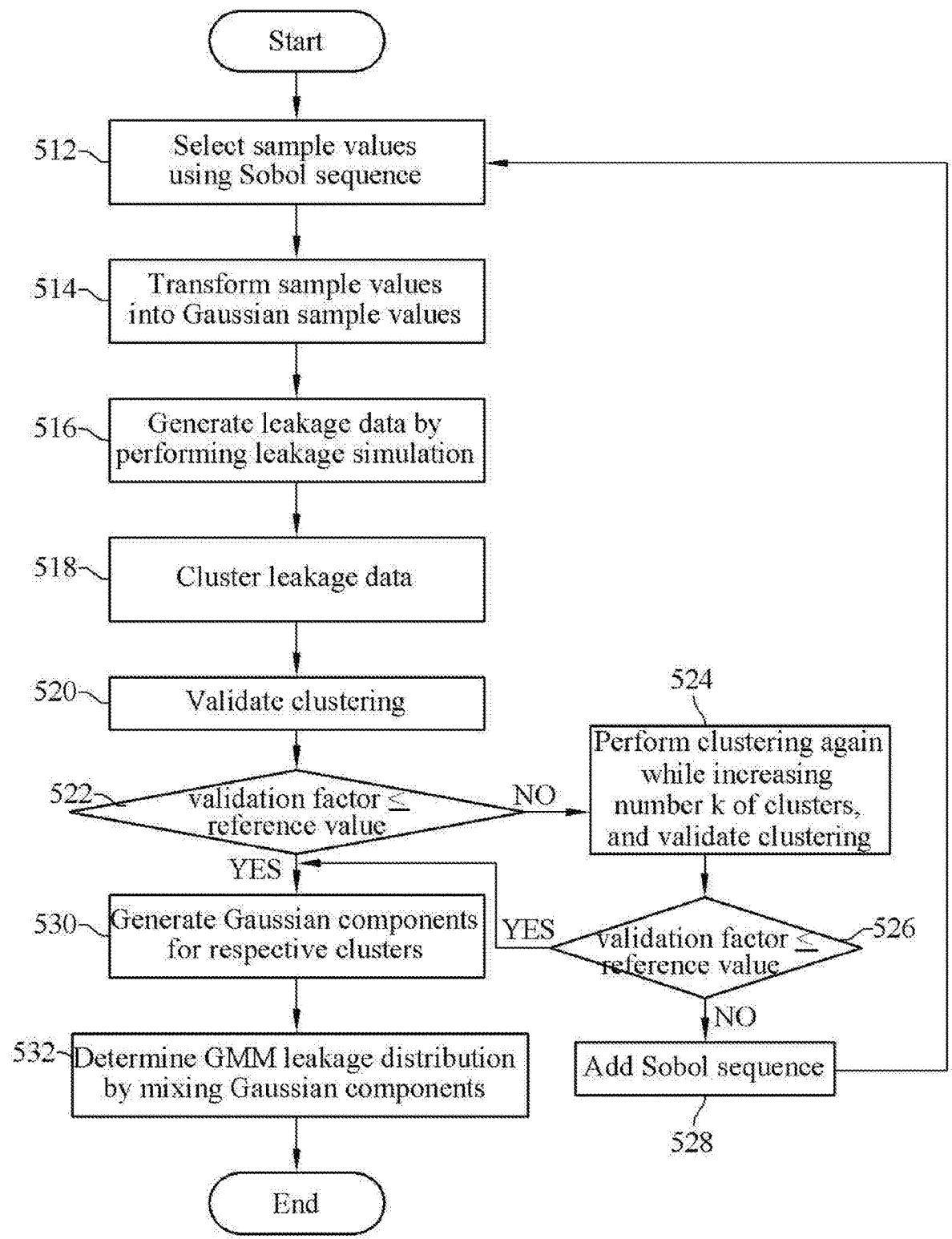
FIG. 5 is a flowchart describing a leakage distribution estimation method in accordance with an embodiment.

FIG. 5 is a flowchart for describing a leakage distribution estimation method in accordance with an embodiment. This method will be described with reference to FIG. 1.

First, leakage current values (or leakage values) of leakage components for transistors in a target circuit according to a transistor type, e.g., for an NMOS transistor and a PMOS transistor, are obtained by changing parameter values of the transistors to correspond to a process variation which may occur during a fabrication process of a corresponding system, e.g., a semiconductor device, including the target circuit, and then the obtained leakage current values are stored in the memory 20 in the form of a LUT. The parameter values may correspond to one or more of a channel length L, a channel width W, a gate voltage Vg, a source voltage Vs, and a drain voltage Vd of a transistor. The leakage components may include one or more of a sub-threshold leakage, a body-to-drain leakage, a body-to-source leakage, a gate-to-body leakage, and so on, relating to the transistor.

The circuit analysis unit 10 performs a circuit simulation using design data of the target circuit whose leakage distribution is to be estimated and extracts node bias information on each of the transistors included in the target circuit. The node bias information extracted by the circuit analysis unit 10 may be stored in the memory 20 or a separate memory (not illustrated) in advance. In another embodiment, the node bias information may be received from outside in advance and stored in the memory 20 or the separate memory (not illustrated).

When a dimension and a length of a Sobol sequence are decided, the parameter sampling unit 30 randomly selects sample values using the Sobol sequence, at step 512.

At this time, the dimension of the Sobol sequence corresponds to the number of parameters, which need to consider a process variation, and the length of the Sobol sequence corresponds to the number of samples which are to be selected.

When the sample values are selected according to the Sobol sequence, the data transformation unit 40 transforms the sample values selected by the parameter sampling unit 30 into Gaussian sample values at step 514.

The Sobol sequence includes sample values generated from a uniform distribution. Typically, since it is assumed that the changes of process parameters follow a Gaussian distribution, a process of transforming the sample values of the Sobol sequence having the uniform distribution into sample values having the Gaussian distribution is required. Therefore, the data transformation unit 40 transforms the sample values selected by the parameter sampling unit 30 into the Gaussian sample values following the Gaussian distribution. The Gaussian distribution has a desired mean and a desired standard deviation. In the present embodiment, the Box-Muller transformation may be used as a method for transforming uniformly distributed sample values into Gaussian sample values.

When the selected sample values are transformed into the Gaussian sample values, the leakage data generation unit 50 generates leakage data by performing a leakage simulation based on the Gaussian sample values, the node bias information provided from the circuit analysis unit 10, and the previously stored LUT information, at step 516.

For example, the leakage data generation unit 50 obtains leakage values (or values of leakage components) for the transistors included in the target circuit by comparing the node bias information, i.e., parameter values L, W, Vg, Vs, and Vd, of each of the transistors, received from the circuit analysis unit 10, with leakage values of LUT files corresponding to a transistor type of each of the transistors. That is, the leakage values for the transistors are acquired at a transistor level.

When the leakage values for the transistors are obtained at the transistor level, the leakage data generation unit 50 obtains the leakage data, i.e., leakage values at a system level, using the leakage values of the transistors obtained at the transistor level.

FIGS. 6A and 6B illustrate a method in which a leakage data generation unit obtains leakage data. The method shows how to obtain leakage values at a system level using leakage values of leakage components at a transistor level.

For example, referring to FIGS. 5 and 6A, since a leakage value at the system level corresponds to a sum of leakage currents flowing from a supply voltage node Vdd to a ground in the corresponding system, the leakage data generation unit 50 first constructs a graph for the target circuit of the corresponding system such as a semiconductor device.

FIG. 6B illustrates a graph constructed with leakage components of transistors included in the target circuit shown FIG. 6A. Although not illustrated, the target circuit of FIG. 6A is based on the supposition that bodies of the respective transistors are coupled to the ground. In the graph of FIG. 6B, nodes n1 to n4 of the transistors in the target circuit of FIG. 6A become vertices of the graph, and leakage components i1 to i18 at the transistor level become edges of the graph. Since, among the leakage components i1 to i18 indicated in FIG. 6A, the leakage components i2 and i8 are leakage currents between data "0" and the ground and the leakage component i18 is a leakage current between ground levels, the leakage components i2, i8, and i18 are not illustrated in the graph of FIG. 6B.

When the graph of FIG. 6B is constructed, the leakage data generation unit 50 forms one cut line CUT1 or CUT2, which divides all of the vertices n1 to n4 into a group including the supply voltage node n1 and a group including the ground node n4, as indicated by the curved cut line CUT1 or CUT2 in FIG. 6B.

The leakage data generation unit 50 obtains the leakage value at the system level by summing up all edges passing over the formed cut line CUT1 or CUT2.

Similarly, the leakage data generation unit 50 obtains leakage values of the transistors for the Gaussian sample values that are from the data transformation unit 40, and then obtains the leakage value at the system level using the obtained leakage values.

For example, when a parameter which needs to consider a process variation is a channel length L, the leakage data generation unit 50 sequentially replaces the channel length L among the parameter values L, W, Vg, Vs, and Vd with the Gaussian sample values and obtains leakage values of the transistors by comparing the parameter values L, W, Vg, Vs, and Vd, in which the channel length L is replaced with each of the Gaussian sample values, with values of the LUT files corresponding to a transistor type of each of the transistors. If the parameter values L, W, Vg, Vs, and Vd corresponding to the Gaussian sample values are not present in the LUT files, the leakage data generation unit 50 may estimate the leakage values of the transistors by performing the 2D linear interpolation method using the values present in the LUT.

Referring back to FIG. 5, when the leakage data considering the process variation, i.e., the leakage values at the system level, for the transistors in the target circuit are obtained, the GMM modeling unit 60 groups the leakage data into a plurality of clusters at step 518, as illustrated in FIG. 7.

For example, when the number of clusters is set to K, the GMM modeling unit 60 may perform an EM algorithm to sort the leakage data into K groups (or K clusters), K being a positive integer. At this time, the clusters correspond to Gaussian components. Through the clustering process, weights, means, and standard deviations of the Gaussian components can be recognized.

The EM algorithm is an iterative method to find maximum likelihood or maximum a posteriori (MAP) estimates of parameters in statistical models. The EM algorithm is frequently used for data clustering in machine learning or computer vision. Therefore, the detailed descriptions thereof are omitted herein.

When the clustering process is completed, the GMM modeling unit 60 may validate the clustering result at step 520.

For validating the clustering result, the GMM modeling unit 60 calculates the sum of squares within a cluster (SSW) and the sum of squares between clusters (SSB) using Equations 1 and 2 below, respectively. The SSW indicates how well leakage data within the cluster are concentrated, and the SSB indicates how well leakage data are divided between the clusters.

$$SSW = \sum_i \sum_{x \in C_i} (x - m_i)^2 \quad \text{[Equation 1]}$$

In Equation 1, x represents leakage data belonging to an i-th cluster, $m_i$ represents the mean of the leakage data in the i-th cluster, and $C_i$ represents the number of leakage data included in the i-th cluster.

$$SSB = \sum_i |C_i|(m - m_i)^2 \quad \text{[Equation 2]}$$

In Equation 2, $C_i$ represents the number of leakage data included in the i-th cluster, m represents the mean of all the leakage data in the clusters, and $m_i$ represents the mean of the leakage data in the i-th cluster.

When the values SSW and SSB are obtained, the GMM modeling unit 60 obtains a ratio of the values SSW and SSB as expressed by Equation 3 below and uses the obtained ratio as a validation factor. At this time, the smaller the validation factor, the better the clustering.

$$\text{Validation factor} = \frac{SSW}{SSB} \quad \text{[Equation 3]}$$

When it is determined that the validation result for the clustering is unsatisfactory at step 522, for example, when a value of the validation factor is larger than a preset reference value, the GMM modeling unit 60 performs the clustering process again while increasing the number K of clusters and validates the clustering result again at step 524.

When the validation result is determined unsatisfactory at step 526 even though the number K of clusters was increased to a preset upper-limit value, i.e., when the value of the validation factor is still larger than the reference value, the GMM modeling unit 60 requests additional sample values from the parameter sampling unit 30 at step 528.

The parameter sampling unit 30 receiving the request for additional sample values from the GMM modeling unit 60 additionally selects sample values by consecutively adding a new Sobol sequence to the existing Sobol sequence. The above-described steps 514 and 516 are performed on the additionally selected sample values in order to collect additional leakage data.

When the clustering validation result is determined satisfactory at step S522 after the leakage data are added, for example, when the value of the validation factor is smaller than or equal to the reference value, the GMM modeling unit 60 generates Gaussian components by calculating Gaussian functions for the respective clusters using the leakage data of the clusters at step 530.

When the Gaussian components are generated, the GMM modeling unit 60 determines a final leakage distribution (or GMM leakage distribution) for the corresponding system by mixing the Gaussian components, e.g., by obtaining a weighted sum of the Gaussian components, at step 532.

For example, the GMM modeling unit 60 may recognize the weights ω, the means μ, and the standard deviations 6 of the respective clusters through the clustering, and sum up the Gaussian components corresponding to the respective clusters in consideration of the weights CO as expressed by Equation 4 below.

$$p(X) = \sum_{i=1}^{K} \omega_i N(X \mid \mu_i, \sigma_i) \quad \text{[Equation 4]}$$

In Equation 4, p(X) is the final leakage distribution and $\omega_i$, $\mu_i$, and $\sigma_i$ represent the weight, mean, and standard deviation of the i-th cluster, respectively.

Figure 8:
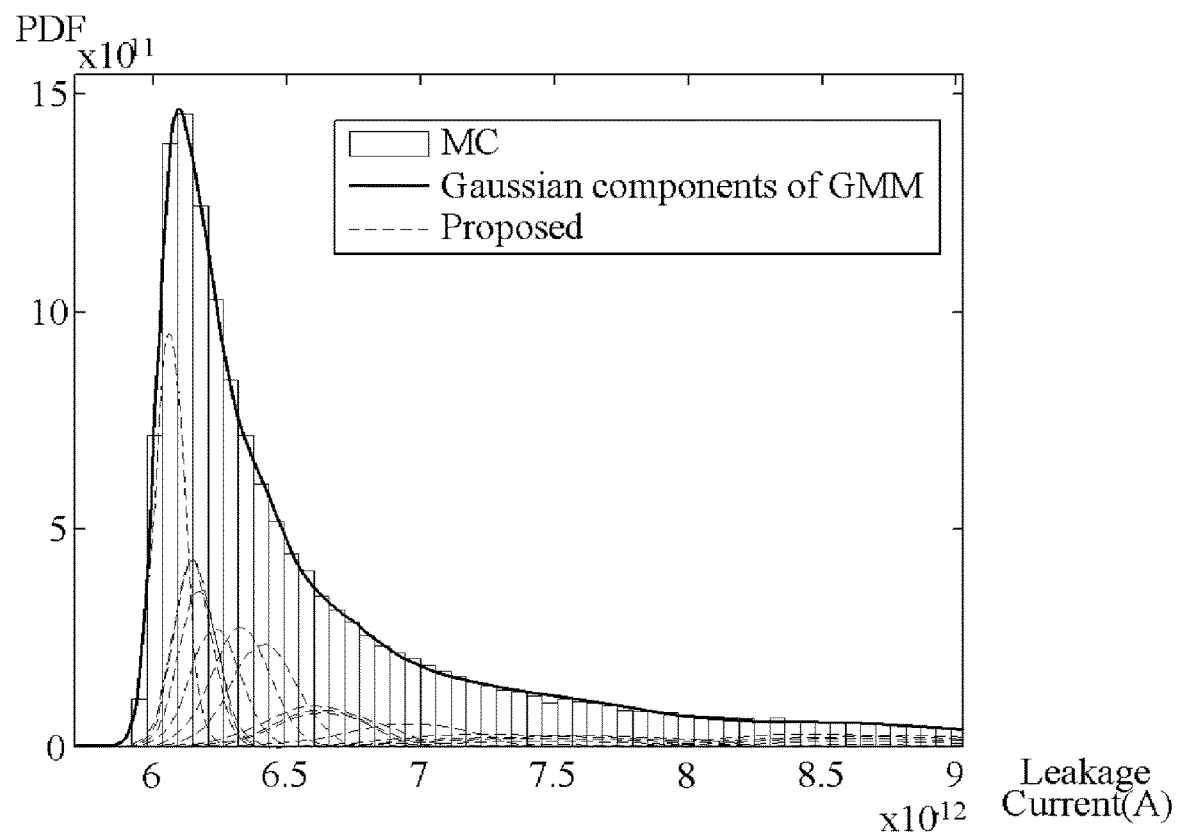
FIG. 8 illustrates Gaussian components corresponding to clusters, a final GMM leakage distribution obtained by mixing the Gaussian components, and a Monte-Carlo (MC) simulation result.

FIG. 8 illustrates Gaussian components corresponding to clusters, a final GMM leakage distribution obtained by mixing the Gaussian components, and a MC simulation result.

For the same system, a simulation method using the GMM in accordance with an embodiment used 10,000 leakage data, and the MC simulation method used 225,174 leakage data.

In FIG. 8, Gaussian distribution (normal distribution) curves indicated by dotted lines at the bottom are distribution curves for the Gaussian components of the GMM in accordance with the present embodiment, and a distribution curve indicated by a solid line is a GMM leakage distribution curve in which the Gaussian components are mixed. Furthermore, histograms represent leakage distributions obtained by performing the MC simulation.

FIG. 8 shows that the GMM simulation in accordance with the present embodiment can estimate a leakage distribution similar to the MC simulation, even though the GMM simulation uses a number of leakage data (i.e., 10,000) that are smaller than the leakage data (i.e., 225,174) used for the MC simulation.

Figure 9:
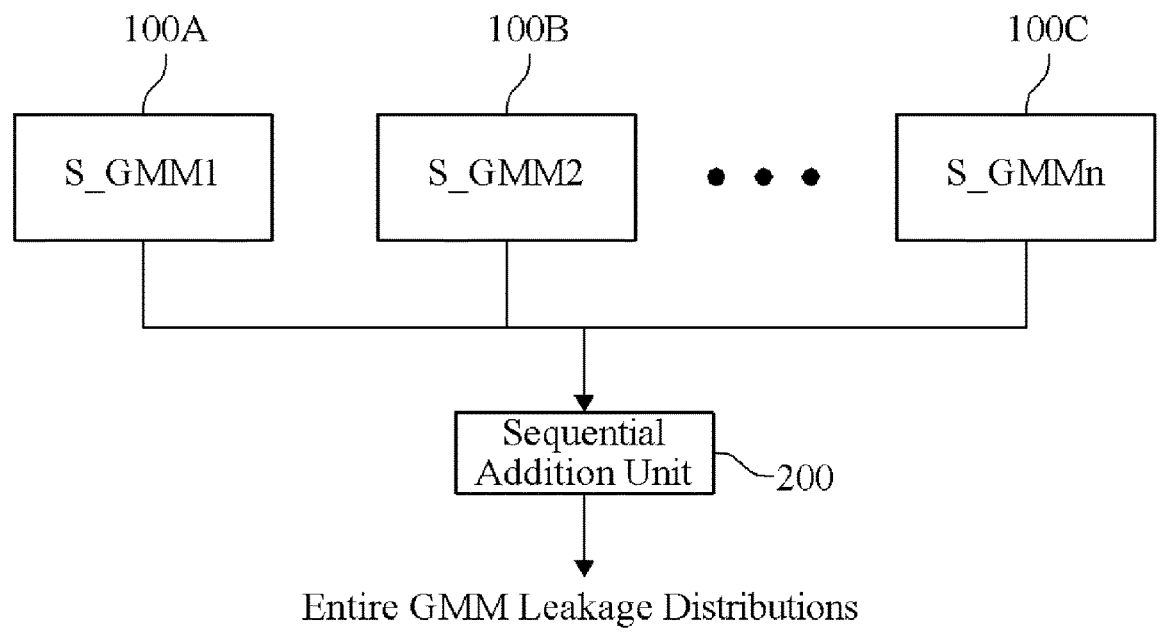
FIG. 9 illustrates a leakage distribution estimation system in accordance with another embodiment.

FIG. 9 illustrates a leakage distribution estimation system in accordance with another embodiment.

The leakage distribution estimation system of FIG. 9 may include a plurality of sub estimation systems 100A to 100C and a sequential addition unit 200.

Like the leakage distribution estimation system of FIG. 1, each of the sub estimation systems 100A to 100C obtains leakage data for a sub system including transistors, using values of leakage components for the transistors and decides a final GMM leakage distribution of the sub system through the GMM modeling for the leakage data. Therefore, the sub estimation systems 100A to 100C may have substantially the same configuration as the leakage distribution estimation system of FIG. 1.

The sequential addition unit 200 generates a leakage distribution for the entire system by sequentially adding the leakage distributions generated by the sub estimation systems 100A to 100C.

The leakage distribution system in accordance with the present embodiment is supposed to generate the final leakage distribution by mixing Gaussian components. Therefore, when the entire system is divided into a plurality of sub systems, the leakage distributions (GMM leakage distributions) of the plurality of sub systems may be individually obtained through the GMM modeling, and then the individually obtained leakage distributions are sequentially added to decide the leakage distribution of the entire system.

For example, the sum of GMM leakage distributions of two sub systems may be performed through the following process.

First, when leakage distributions p1 and p2 of the two sub systems are represented by $$X : p_1 = \sum_i^{N_1} \omega_i \frac{1}{\sigma_i \sqrt{2\pi}} e^{-\frac{(x-\mu_i)^2}{2\sigma_i^2}} \text{ and}$$

$$Y : p_2 = \sum_j^{N_2} \omega_j \frac{1}{\sigma_j \sqrt{2\pi}} e^{-\frac{(x-\mu_j)^2}{2\sigma_j^2}},$$

the characteristic functions of two random variables may be represented by $$\varphi_X = \sum_i^{N_1} \omega_i e^{it\mu_i - \frac{t^2 \sigma_i^2}{2}} \text{ and}$$

$$\varphi_Y = \sum_j^{N_2} \omega_j e^{it\mu_j - \frac{t^2 \sigma_j^2}{2}},$$

according to the definition of the characteristic functions. Herein, X and Y are Gaussian components, p1 is leakage distribution of an i-th cluster and $\omega_i$, $\mu_i$, and $\sigma_i$ represent the weight, mean, and standard deviation of the i-th cluster, respectively. p2 is leakage distribution of a j-th cluster and $\omega_j$, $\mu_j$, and $\sigma_j$ represent the weight, mean, and standard deviation of the j-th cluster, respectively. N1 and N2 are Gaussian sample values.

When the sum of two random variables X and Y is represented by Z, the characteristic function of Z may be represented by the product of the characteristic functions of X and Y. Therefore, the characteristic function of Z is equal to $$\varphi_Z = \varphi_{X+Y} = \varphi_X \varphi_Y = \sum_i^{N_1} \sum_j^{N_2} \omega_i \cdot \omega_j \cdot e^{it(\mu_i + \mu_j) - \frac{t^2(\sigma_i^2 + \sigma_j^2)}{2}}.$$

The characteristic function of Z may be expressed as a probability density function (PDF) p3 as follows.

$$Z : p_3 = \sum_i^{N_1} \sum_j^{N_2} \omega_i \cdot \omega_j \cdot \frac{1}{\sqrt{(\sigma_i^2 + \sigma_j^2)} \sqrt{2\pi}} e^{-\frac{(x-(\mu_i+\mu_j))^2}{2\sigma_i^2}}$$

Figure 10:
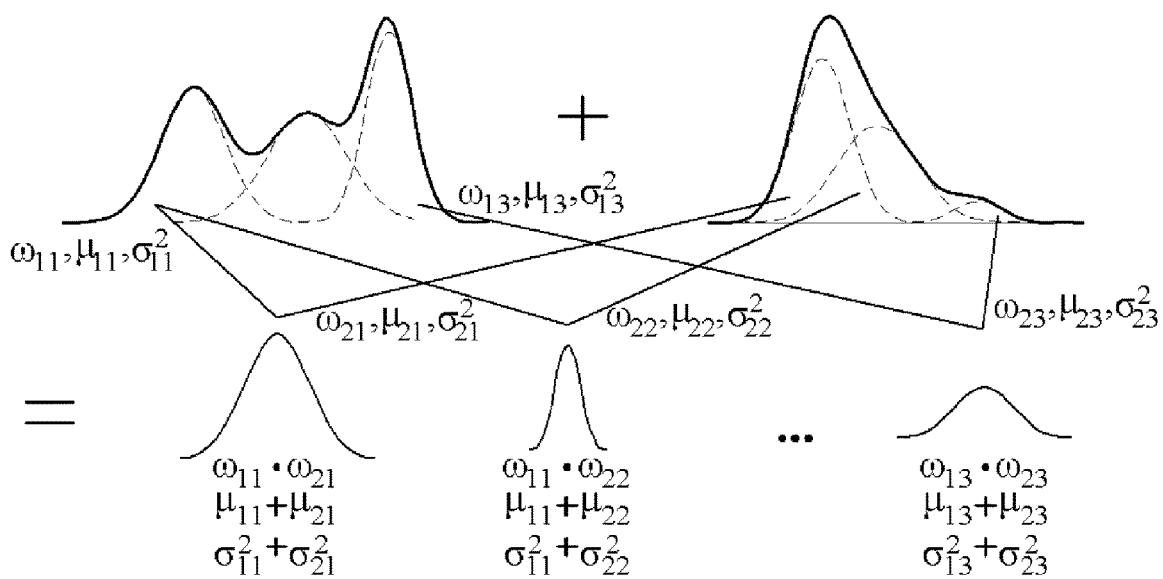
FIG. 10 schematically illustrates a process of summing up two GMM leakage distributions.

The result may be analyzed as illustrated in FIG. 10. In FIG. 10, Gaussian components of X and Y constitute one pair to form a new Gaussian component, when X and Y are expressed as distribution curves based on the GMM. The weight ω of the new Gaussian component corresponds to the product of two weights, and the mean μ and the variance $\sigma^2$ correspond to the sum of two means and the sum of two variances, respectively. When new Gaussian components are generated for pairs corresponding to Gaussian components of all X and Y, the new Gaussian components are added up to constitute one leakage distribution, and thus the resultant leakage distribution for the entire system is generated.

The sequential addition unit 200 generates the leakage distribution for the entire system by sequentially adding the leakage distributions (GMM leakage distributions) generated through the respective sub estimation systems 100A to 100C according to the above-described method.

In some embodiments, each of the sub systems may be implemented using some blocks in one semiconductor device, or a chip in a multi-chip package, which includes one or more processors.

In the above-described embodiment, the leakage data generation unit 50 of FIG. 1 obtains values of leakage components at a transistor level using a LUT. However, the present embodiment is not limited thereto. For example, the leakage data generation unit 50 may obtain the values of the leakage components of transistors through a circuit simulation using a simulator, e.g., HSPICE.

In accordance with the embodiments of the present disclosure, the inventive leakage distribution estimation system and method can obtain substantially the same result as the MC simulation, using a number of leakage data that is much smaller than a number of leakage data (simulation data) used during the MC simulation using HSPICE. Thus, the inventive leakage distribution estimation system and method can efficiently perform the leakage analysis while reflecting a process variation of a semiconductor device.

Furthermore, the inventive leakage distribution estimation system and method can separately collect leakage data for some blocks of the entire circuit, analyze the collected leakage data, and combine the collected leakage data to thereby analyze leakage for the entire circuit.

Although various embodiments have been described for illustrative purposes, it will be apparent to those skilled in the art that various changes and modifications may be made without departing from the spirit and scope of the invention as defined in the following claims.

What is claimed is:

1. A leakage distribution estimation method of a semiconductor device, the method comprising:
   selecting sample values for parameters which are changed according to a process variation of the semiconductor device;
   transforming the selected sample values into Gaussian sample values;
   generating leakage data of the semiconductor device by performing a leakage simulation using node bias information on switching elements included in the semiconductor device, information extracted for leakage components of the switching elements, and the Gaussian sample values;

clustering the leakage data into a plurality of clusters;

generating Gaussian components corresponding to the respective clusters using the leakage data of the clusters, wherein the Gaussian component comprises a Gaussian distribution for leakage data included in a corresponding cluster; and determining a leakage distribution of the semiconductor device by mixing the Gaussian components.

2. The leakage distribution estimation method of claim 1, wherein the information extracted for the leakage components of the switching elements is stored in the form of a lookup table, which contains leakage current values matched with values of parameters of the switching elements, the leakage current values being previously extracted for the leakage components according to each type of the switching elements, when the values of the parameters of the switching elements are being changed.

3. The leakage distribution estimation method of claim 2, wherein the generating of the leakage data comprises:

obtaining first leakage values of the leakage components for each of the switching elements by comparing the node bias information of the switching element with values of the lookup table, and generating the leakage data of the semiconductor device using the first leakage values of the leakage components for the switching elements included in the semiconductor device; and obtaining second leakage values of the leakage components for each of the switching elements by comparing the Gaussian sample values with the values of the lookup table, and generating the leakage data of the semiconductor device using the second leakage values of the leakage components for the switching elements included in the semiconductor device.

4. The leakage distribution estimation method of claim 3, wherein the generating of the leakage data of the semiconductor device using the first or second leakage values of the leakage components for the switching elements comprises constructing a graph in which nodes of the switching elements are set to vertices and the leakage components for the switching elements are set to edges, forming one cut line to divide all of the vertices into a group including a supply voltage node and a group including a ground node, and calculating the leakage data of the semiconductor device by summing up values of edges passing the cut line.

5. The leakage distribution estimation method of claim 1, further comprising validating the clustering, before generating the Gaussian components.

6. The leakage distribution estimation method of claim 5, wherein the validating of the clustering comprises calculating a sum of squares within a cluster (SSW) and a sum of squares between clusters (SSB) and validating the clustering using a ratio of the SSW to the SSB as a validation factor, wherein the SSW indicates how well leakage data within the cluster are concentrated and the SSB indicates how well leakage data are divided between the clusters.

7. The leakage distribution estimation method of claim 6, wherein the validating of the clustering comprises repeating the clustering and the clustering validation while increasing the number of clusters when the validation factor is larger than a reference value, wherein the number of clusters is increased to a pre-defined upper limit value.

8. The leakage distribution estimation method of claim 1, wherein the selecting of the sample values for the parameters comprises generating a Sobol sequence in which a number of parameters is set to a dimension of the Sobol sequence and a number of samples is set to a length of the Sobol sequence.

9. The leakage distribution estimation method of claim 1, wherein the clustering comprises dividing the leakage data into a preset number of clusters by performing an EM algorithm.

10. The leakage distribution estimation method of claim 1, wherein the mixing of the Gaussian components comprises mixing the Gaussian components through a weighted sum of the Gaussian components in consideration of weights of clusters corresponding to the Gaussian components.

11. The leakage distribution estimation method of claim 1, wherein the transforming the selected sample values into Gaussian sample values is performed using Box-Muller transformation.

12. The leakage distribution estimation method of claim 1, wherein when leakage data corresponding to the node bias information or the Gaussian sample values are not included in the information extracted for the leakage components of the switching elements, the leakage values of the leakage components corresponding to the node bias information, or the Gaussian sample values are estimated by performing 2D linear interpolation.

13. The leakage distribution estimation method of claim 1, further comprising extracting the node bias information by performing a circuit simulation on connection information among the switching elements included in the semiconductor device, the connection information being based on a netlist of the semiconductor device.

* * * * *